No. 781,070. PATENTED JAN. 31, 1905.
E. R. HEWITT.
SELF PROPELLING VEHICLE.
APPLICATION FILED APR. 8, 1904.
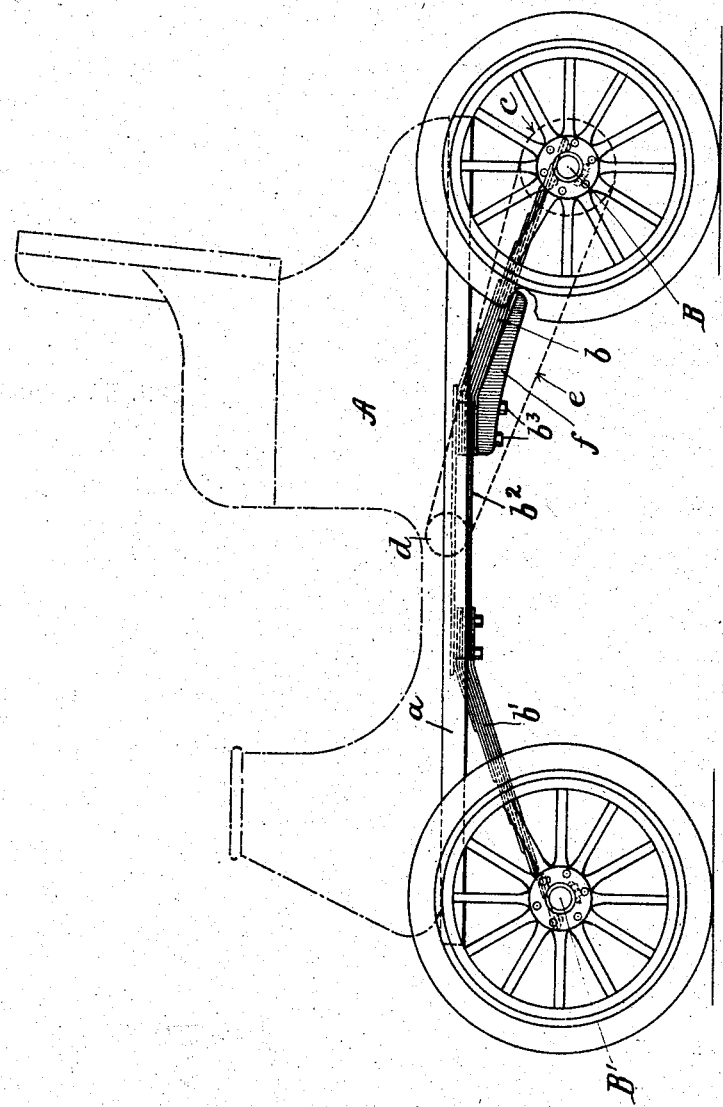
Witnesses
Inventor
Edward R. Hewitt
By his Attorney No. 781,070.

Patented January 31, 1905.

UNITED STATES PATENT OFFICE.

EDWARD R. HEWITT, OF NEW YORK, N. Y.

SELF-PROPELLING VEHICLE.

SPECIFICATION forming part of Letters Patent No. 781,070, dated January 31, 1905.

Application filed April 8, 1904. Serial No. 202,277.

*To all whom it may concern:*

Be it known that I, EDWARD R. HEWITT, a citizen of the United States, residing at the city of New York, in the borough of Manhattan and State of New York, have invented certain new and useful Improvements in Self-Propelling Vehicles, of which the following is a full, clear, and exact description.

This invention relates to self-propelling vehicles, the primary object being to provide a vehicle which will run with uniform movement notwithstanding irregularities and obstructions in the road; also, to provide an easy-riding vehicle and protection of the springs from breakage.

With these objects in view my invention consists of the construction and combinations hereinafter described and claimed.

In the accompanying drawing the figure is a side elevation of a vehicle with portions in dotted lines.

The invention has special reference to that type of vehicle in which by the yielding of the springs supporting the body the wheels on the two axles are permitted to approach and recede from each other, and the main advantages of my invention are derived in a vehicle of the kind described when its driving-axle is rotated from a motor-shaft through the agency of a chain.

A common type of vehicle-spring which permits the axles to approach and recede from each other is known as the "Concord" spring, which consists of two pairs of leaf-springs, one pair supporting the vehicle on the forward axle and the other on the rearward axle, the members of each pair being bolted to a stiff part of the frame upon which the body is supported and at an intermediate point between the axles and reaching thence in a downwardly-inclined direction to the axle, to which they are rigidly fixed. With springs of this character it is evident that the vertical oscillations of the body cause the axles to approach and recede from each other, and when this vertical oscillation occurs excessively it becomes unpleasant to the passengers. Furthermore, and what is more important, the driving-chain connecting the driving-pinion with the driving-gear on one of the axles is alternately put under tension above and below its normal driving tension, which results in an irregular transmission of power from the motor to the axle and in consequence a jerky movement of the vehicle. My invention is designed, primarily, to prevent this jerky movement, and it accomplishes that desirable result by means of a stop applied to the vehicle-spring in such a manner that the spring is permitted to yield in a downward direction, but is prevented from yielding to upward movements, the latter being more especially responsible for the irregular motions of the vehicle, since the upward movements cause a slackening of the chain and a momentary slowing of the vehicle, due to a failure in transmission of power.

Referring to the drawing by letter, A indicates in dotted lines the body of the vehicle, supported upon a rigid frame $a$.

B and B' are the rear and front axles, respectively, which support the vehicle through the springs $b$ and $b'$, the springs on one side only being shown. Each spring consists of a number of leaves of graduated length, and each is connected at its thicker end rigidly to the frame $a$ or to a subframe $b^2$, mounted thereon by means of bolts $b^3$ in the usual manner. The thinner ends of the springs extend in a downwardly-inclined direction rearward and forward, respectively, and are rigidly secured to the respective axles. This type of spring, which, as before stated, is known as the "Concord" spring, causes the axles to spread apart when any force acting downward is applied to the body, and likewise the reverse or upward movement of the body draws the axles toward each other. Irregularities and obstructions encountered in the road will therefore cause the body to partake of these movements and the wheels to alternately spread and approach each other.

Upon the rear axle is mounted a driving wheel or gear $c$, and upon the body-frame is a driving-pinion $d$, power from which to move the vehicle is transmitted to the wheel $c$ through the chain $e$. The two wheels and chain are indicated by dotted lines only, and it will be understood that the vehicle carries a motor of some character delivering power to the pinion $d$. It will now be seen that when a front or rear wheel runs into a rut and the weight of the body causes the axles to spread the chain $e$ will be tightened, resulting in a momentary acceleration of the vehicle, which will help it out of the rut. This is not objectionable, but quite the reverse. When, however, the body rebounds, the wheels are drawn together by the bowing of the springs and the chain is slackened. This results in a momentary retardation of the vehicle, to prevent which I apply a stop-plate $f$, consisting of a wooden or metallic bracket bolted rigidly to the stiff frame, to which the end of the spring is fastened, preferably by means of the same bolts $b^3$ that hold the end of the spring. This plate reaches in a downwardly-inclined direction beneath the spring and is entirely independent thereof, but covers a substantial portion of the length of the longest leaf of the spring. With this stop in position it will be seen that the action of the spring under the downward movements of the body is not interfered with, the usual resiliency being permitted and affording the usual relief from shocks. The upward movements of the vehicle-body are, however, interrupted and limited by the impact of stop $f$ against the under side of the spring. The pressure of the plate against the spring stiffens it and prevents further bowing. This contact occurs at approximately the instant when the pulling side of the chain is under normal tension and prevents any change thereof. Hence the vehicle instead of being momentarily retarded continues at a uniform speed. One of these stop-plates will be placed under each of the rear springs or under the springs which connect with the driving-axle. The result is much smoother riding and no detraction from the resiliency of the springs at the times when resiliency is an advantage.

It will also be seen that the bracket protects the spring, in that by preventing the bowing the leaves are prevented from separating and the lower leaf is reinforced.

Having described my invention, I claim—

1. In a self-propelled vehicle, the combination of a body-frame supporting a power-driven shaft, two axles, spring connections between the frame and axles permitting the axles to approach and recede from each other during the vertical oscillations of the body, a power-transmitting chain whose tension is altered by said movement of the axles and means acting upon said spring connections for limiting the approach of the wheels.

2. In a self-propelling vehicle, the combination of a "Concord" spring and a stopping device acting on said spring limiting the upward movement of the body with respect to the axle.

3. In a self-propelling vehicle, the combination of a "Concord" spring, a power-transmitting chain and a device acting on said spring for limiting the upward movement of the body with respect to the axle.

4. In a self-propelling vehicle, an inclined spring connecting the vehicle-body and the axle, in combination with a chain for transmitting power from the body of the vehicle to the axle and means acting on said spring for limiting the upward movement of the body of the vehicle with respect to the axle.

5. In a self-propelling vehicle, the combination of an axle and driving-chain therefor, a body-frame, an inclined leaf-spring connecting the frame with the axle and a device acting on said spring adapted to prevent the bowing of the spring.

6. In a self-propelling vehicle, the combination of an axle, a driving-chain therefor, a body-frame, an inclined leaf-spring connecting the frame with the axle and a stop-plate applied beneath the spring to prevent it from bowing when the body moves upward with respect to the axle.

7. In a self-propelling vehicle, the combination with the body-frame, one of the axles and a spring connecting said frame and axle, of a bracket fixed to said frame beneath said spring and adapted to engage the latter for preventing it from bowing when the body moves upward with respect to the axle.

8. In a self-propelling vehicle, the combination with the body-frame, one of the axles and an inclined leaf-spring connecting said frame and axle, of a bracket fixed to said frame and having one end inclined and located beneath said spring, as and for the purpose set forth.

In witness whereof I subscribe my signature in presence of two witnesses.

EDWARD R. HEWITT.

Witnesses:
 FRANK S. OBER,
 WALDO M. CHAPIN.